United States Patent
Fuss

(10) Patent No.: US 6,179,034 B1
(45) Date of Patent: Jan. 30, 2001

(54) INTERNALLY MOUNTED SUNROOF SCREEN ARRANGEMENT

(76) Inventor: Lisa M. Fuss, 608 Gravel Hill Rd., Southampton, PA (US) 18966

( * ) Notice: Under 35 U.S.C. 154(b), the term of this patent shall be extended for 0 days.

(21) Appl. No.: 09/435,426

(22) Filed: Nov. 8, 1999

(51) Int. Cl.[7] ............................................. B60J 7/00
(52) U.S. Cl. ............................... 160/105; 296/214
(58) Field of Search .................... 160/105, 371, 160/369, 90, 370.21; 296/214, 219, 220.01

(56) References Cited

U.S. PATENT DOCUMENTS

| 4,104,825 | * | 8/1978 | Hosmer | 160/369 X |
| 4,285,383 | | 8/1981 | Steenburgh | 160/374 |
| 4,398,586 | | 8/1983 | Hall | 160/105 |
| 4,717,200 | * | 1/1988 | Kruger | 296/214 |
| 4,799,422 | | 1/1989 | Birt | 98/2.13 |
| 5,149,170 | * | 9/1992 | Matsubara et al. | 296/214 X |
| 5,299,616 | | 4/1994 | Sholtz | 160/89 |
| 5,609,387 | * | 3/1997 | Stallfort et al. | 296/214 |
| 5,810,429 | * | 9/1998 | Jardin et al. | 296/214 |
| 5,984,405 | * | 11/1999 | Ciacci | 296/218 |

* cited by examiner

*Primary Examiner*—David M. Purol
(74) *Attorney, Agent, or Firm*—Henderson & Sturm LLP

(57) ABSTRACT

A screen arrangement 10 for the sunroof opening of a vehicle 100. The arrangement includes a pair of track members 20 disposed on the opposite sides of the sunroof opening 101 and dimensioned to receive slide elements 34 which depend downwardly from a framework 32 which supports a screen member 30 and has a sealing gasket 35 formed on the upper portion and a latching unit 13 for captively engaging the framework 30 relative to the track members 20. The track members 20 are pivotable between an open and a closed position.

15 Claims, 4 Drawing Sheets

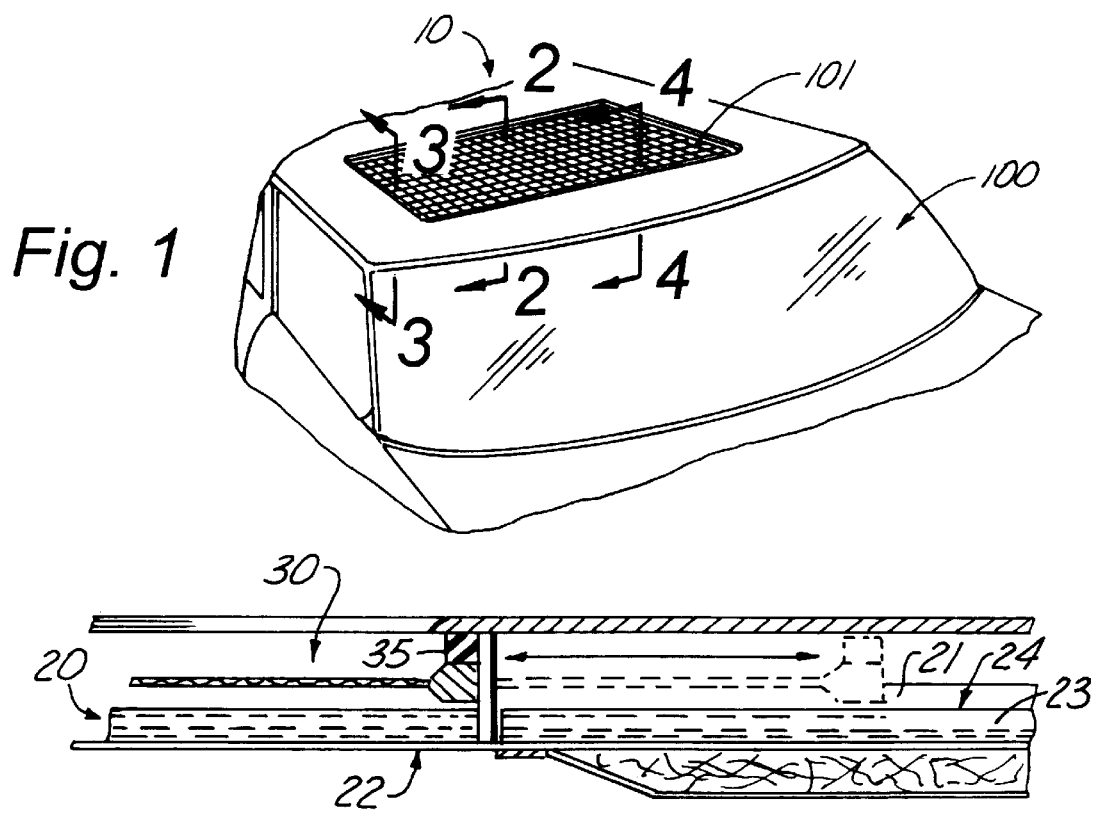
Fig. 1
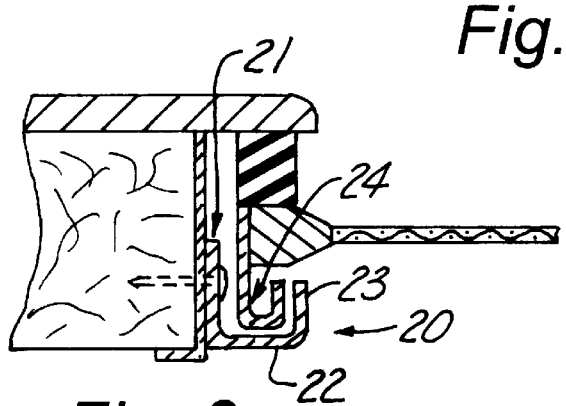
Fig. 2
Fig. 3
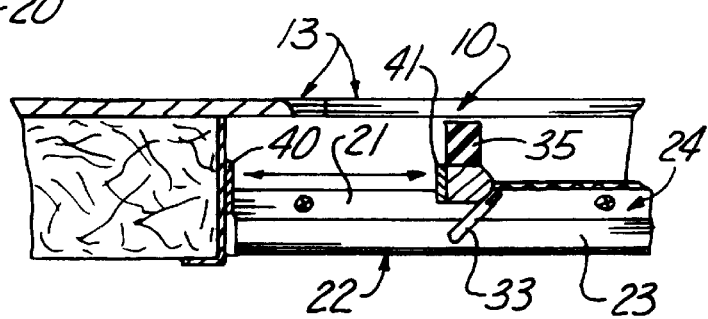
Fig. 4

INTERNALLY MOUNTED SUNROOF SCREEN ARRANGEMENT

BACKGROUND OF THE INVENTION

1. Field of the Invention

The present invention relates to the field of automobile accessories in general, and in particular to an internally mounted screen arrangement for vehicle sunroofs.

2. Description of Related Art

As can be seen by reference to the following U.S. Pat. Nos. 4,285,383; 4,398,586; 4,799,422; and 5,299,616, the prior art is replete with myriad and diverse vehicle sun screen arrangements.

While all of the aforementioned prior art constructions are more than adequate for the basic purpose and function for which they have been specifically designed, they are uniformly deficient with respect to their failure to provide a simple, efficient, and practical vehicle sunroof screen arrangement that is mounted on the interior of a vehicle so as to maintain the aerodynamic profile of the exterior of the vehicle and further allow the sunroof mechanism to function in the normal manner when the screen arrangement is in place.

As most owners of vehicles equipped with sunroofs are all too well aware, one of the major disadvantages of having a sunroof is the fact that leaves, debris, and flying insects can enter into the interior of the vehicle through the sunroof opening.

As a consequence of the foregoing situation, there has existed a longstanding need for a new and improved type of internally mounted sun screen arrangement for vehicle sunroofs that can quickly and easily be mounted and installed within the passenger compartment of a vehicle, and the provision of such an arrangement is a stated objective of the present invention.

BRIEF SUMMARY OF THE INVENTION

Briefly stated, the screen arrangement for the interior of vehicles equipped with a retractable roof panel that defines a sunroof opening comprises in general, a track unit suspended from the interior surface of the roof of the vehicle, a screen unit slidably disposed in said track unit, and a latching unit operatively associated with both the screen unit and the track unit for captively engaging the screen unit beneath the sunroof opening.

As will be explained in greater detail further on in the specification, the screen unit comprises a screen member fabricated from a sheet of flexible screen material which is suspended by a framework which is slidably received in said track unit.

In addition, the track unit comprises a pair of track members which are provided with a pivoted connection that allows the track members 20 to swing downwardly to remove the screen member 30 for cleaning.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the screen arrangement mounted in a vehicle that has the sunroof disposed in the retracted position;

FIG. 2 is a cross sectional view taken through line 2—2 of FIG. 1;

FIG. 3 is a cross sectional view taken through line 3—3 of FIG. 1;

FIG. 4 is a cross sectional view taken through line 4—4 of FIG. 1;

DETAILED DESCRIPTION OF THE INVENTION

Figure 5:
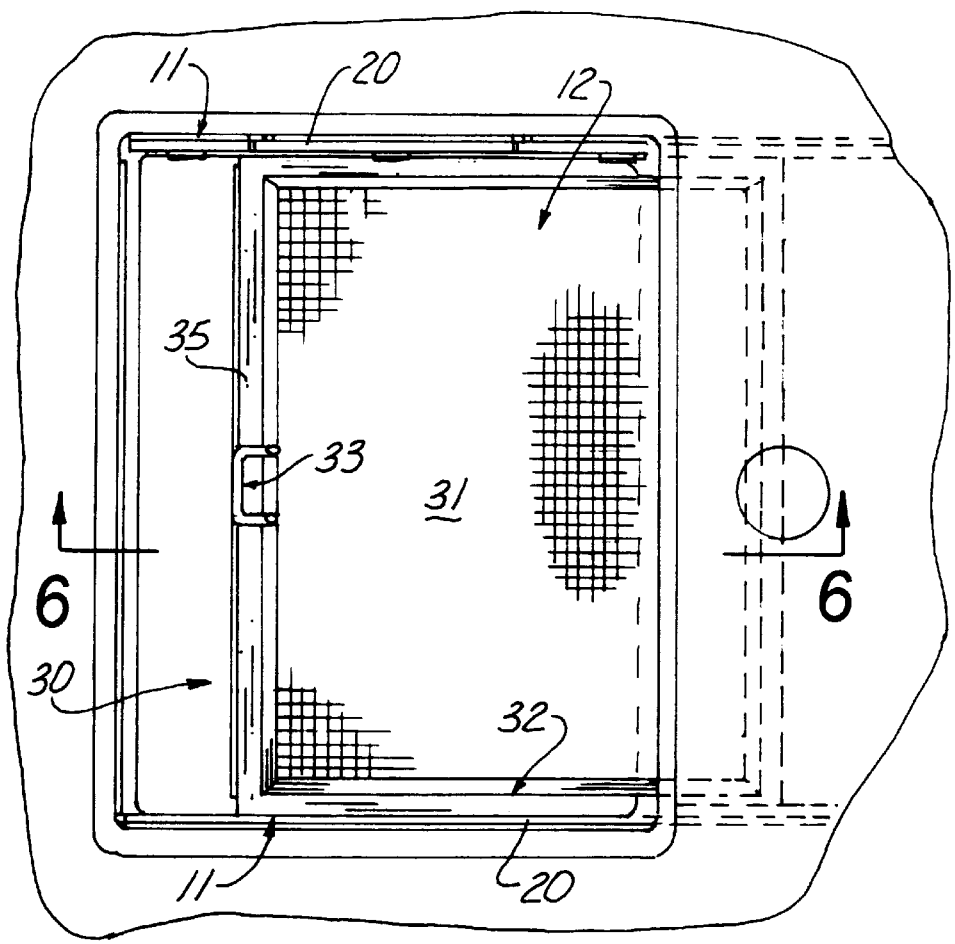
FIG. 5 is a top plan view looking down on the screen arrangement through the open sunroof.

As can be seen by reference to the drawings, and in particularly to FIG. 1, the sunroof screen arrangement that forms the basis of the present invention is designated generally by the reference number 10. The arrangement 10 is specifically designed to be installed below the sunroof opening 101 in a vehicle 100 and comprises in general, a mounting unit 11, a screen unit 12, and a latching unit 13. These units will now be described in seriatim fashion.

As can best be seen by reference to FIGS. 2 through 5, in the first version of the preferred embodiment, the mounting unit 11 comprises a pair of elongated track members 20. Each of the track members 20 have a generally J-shaped cross sectional configuration which includes a raised rear wall 21, a bottom portion 22, and a front lip 23 which define an elongated shallow channel 24 whose purpose and function will be described further on in the specification.

In addition, as shown in FIGS. 3 and 4, the raised rear walls 21 of the track members are fixedly secured to the opposed sides of the sunroof opening 101 such that the track members 20 are aligned in parallel fashion along the opposite sides of the opening 101, the bottom portion 22 of the track members supports a portion of the screen unit 12 and the front lip 23 retains the aforementioned portion of the screen unit 12 within the channel 24 in a well recognized fashion.

As shown in FIGS. 5 through 7, and 9, the screen unit 12 comprises a slidable screen member 30 fabricated from a sheet of screen material 31 that is suspended within a generally rectangular rigid framework 32 having at least one handle element 33 for sliding the screen unit 12 relative to the track unit 11.

In addition, the opposed sides of the framework 32 are provided with a J-shaped slide element 34 which depend downwardly from the sides of the framework 32 and are dimensioned to be received in the shallow channel 24 in the track member 20. The upper portion of the framework is provided with a peripheral sealing gasket 35.

In this version of the invention depicted in FIG. 5, the latching unit 13 comprises a pair of complementary magnetic members 40 and 41 wherein one of the magnetic members 40 is positioned on the front of the interior of the sunroof opening 101 and the other magnetic member 40 is provided on the front end of the framework member 32.

Figure 6:
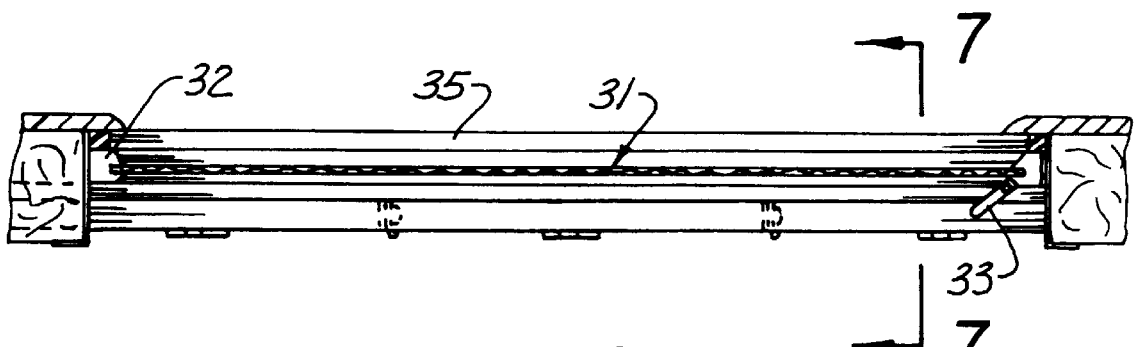
FIG. 6 is a cross sectional view taken through line 6—6 of FIG. 5.
Figure 7:
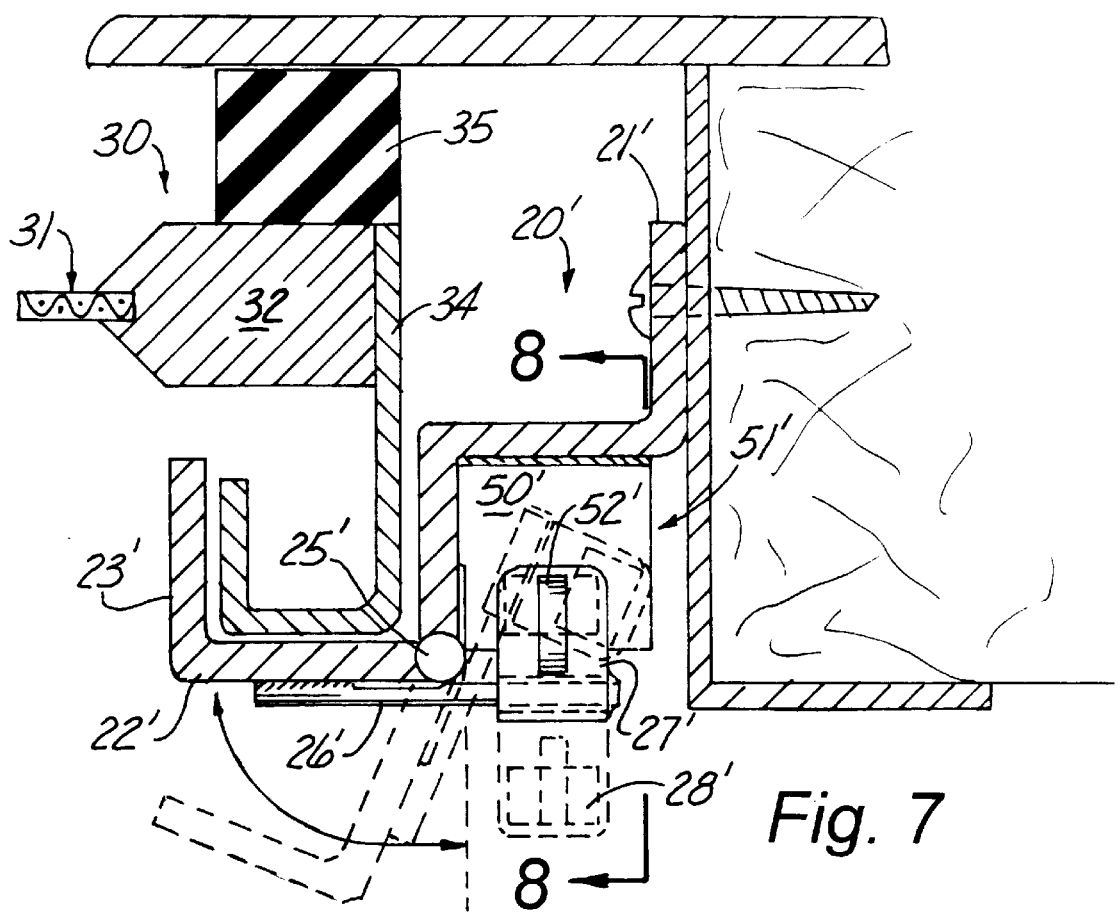
FIG. 7 is a cross sectional view taken through line 7—7 of FIG. 6.
Figure 8:
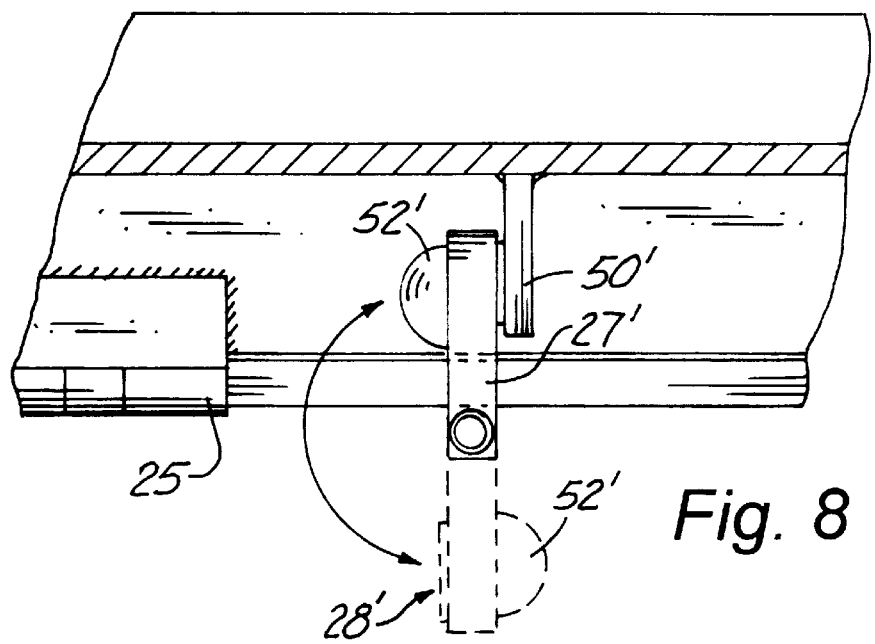
FIG. 8 is a cross sectional view taken through line 8—8 of FIG. 7.
Figure 9:
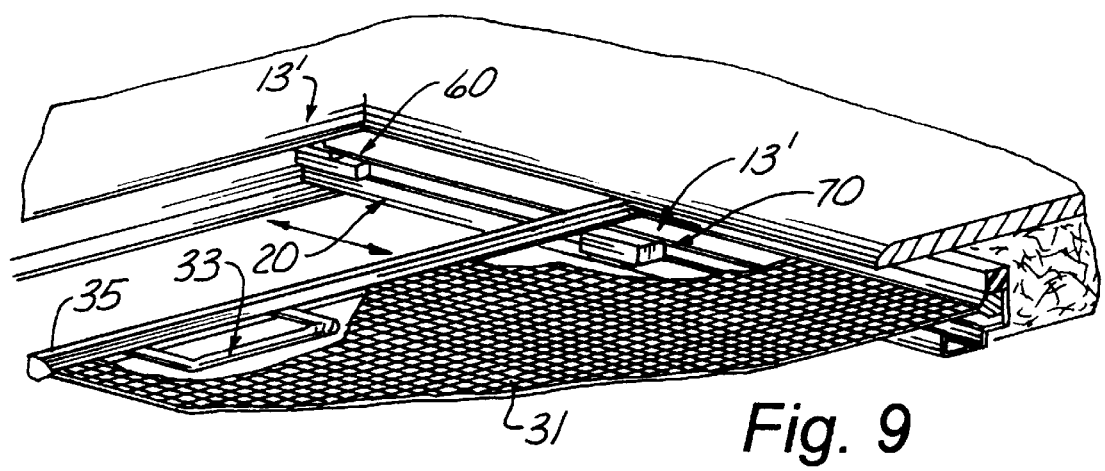
FIG. 9 is a partial cut away view taken through the roof of the vehicle and illustrating an alternate latching unit.
Figure 10:
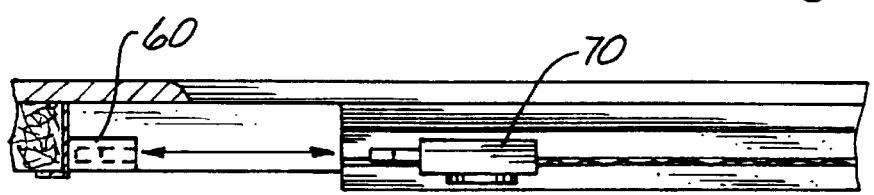
FIG. 10 is a side plan view of the alternate latching unit.
Figure 11:
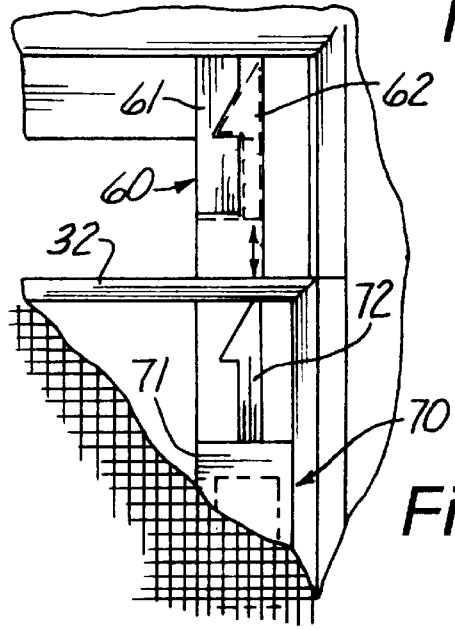
FIG. 11 is a top plan view of the latching unit.
Figure 12:
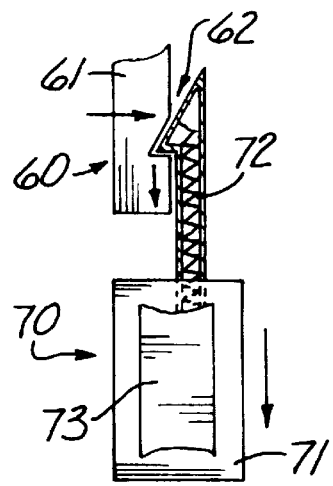
FIG. 12 is an isolated detail view of the cooperating latch elements.

In a second version of the preferred embodiment depicted in FIGS. 6 through 8, it can be seen that each of the track members 20' have an outboard end which includes the lip 23' and bottom 22' which are pivotally connected as at 25' to the generally S-shaped rear wall 21' of the respective track members 20 such that the track members 20' may be opened to allow the screen member 30 to be removed for cleaning.

In this particular version, the pivoting section 22', 23' of each track member 20' is provided with a rod 26' which is fixedly secured to the bottom 22' of the track member 20' and provided with a rotatable arm 27' having a magnetic element 28' which is attracted to a magnetically attractive plate 50' which depends downwardly from a recess 51' formed beneath the fixed portion 21' of the track member 20'.

In addition, the rotatable arm 27' is further provide with a knob element 52' which can be grasped to rotate the arm 27' about the rod 26' to open and close the track member 20'.

As can best be appreciated by reference to FIGS. 7 and 8, when the track member 20' is in the closed position depicted in solid lines, the arm 27' is in the "up" position so that the magnetic element 28' engages the magnetically attractive plate 50'. Then, if the user wishes to open the track member 20' to the dotted line position, the knob 52' is grasped and the arm 27' is pivoted downwardly which breaks the magnetic attraction and allows the free end of the rod 26' to rotate upwardly into the recess 51' formed beneath the track member 20'.

In yet another version of the preferred embodiment depicted in FIGS. 9 through 12, it can be seen that the latching unit 13 comprises a pair of track mounted catch members 60 and a pair of frame mounted latch members 70. Each of the catch members 60 includes a block of material 61 fixedly secured at the front end of each track member 20 and having an angled notch 62 formed on one side.

In addition, each of the latch members 70 includes a housing 71 that is fixedly secured beneath the front end of the opposite sides of the screen member 30 and which receives a spring loaded prong element 72 that is dimensioned to be releasably engaged in the notches 62 of the respective catch members 60. The prong elements 72 can be releasably engaged therefrom by a push button release element 73.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A screen arrangement for the sunroof opening in a vehicle wherein the arrangement comprises:
   a mounting unit including a pair of elongated track members mounted on opposite sides of the sunroof opening wherein each track member has a rear wall, a bottom portion, and a front lip which define an elongated shallow channel; wherein each track of the track members has a Generally J-shaped cross sectional configuration;
   a screen unit including a a screen member suspended within a generally rigid framework member having opposite sides provided with downwardly depending slide elements that are dimensioned to be received in said elongated shallow channel in each track member; and,
   first means for captively engaging the screen unit relative to the mounting unit.

2. The arrangement as in claim 1 wherein the slide elements have a generally J-shaped cross sectional configuration.

3. The arrangement as in claim 1 wherein the framework member has an upper end provided with a sealing gasket.

4. The arrangement as in claim 1 wherein the bottom portion and raised lip of each track member are pivotally associated with the rear wall of the respective track members.

5. The arrangement as in claim 4 wherein each track member is further provided with:
   second means for releasably maintaining each track member in a pivoted closed position.

6. The arrangement as in claim 4 wherein the rear wall of each track member has a generally S-shaped cross sectional configuration which defines an elongated recess which is provided with a magnetic plate element.

7. The arrangement as in claim 6 wherein said second means comprises:
   a rod fixedly secured to the bottom portion of each track member and dimensioned to be received within said recess and provided with a rotatable arm provided with a magnetic element that is engageable with said magnetically attractive plate element.

8. The arrangement as in claim 1 wherein said first means comprises:
   a pair of complementary magnetic members wherein one of the magnetic members is provided on the front edge of the framework member and the other magnetic member is provided on the front portion of the sunroof opening.

9. The arrangement as in claim 1 wherein said first means comprises:
   a pair of latch members disposed on opposite sides of the front edge of the framework member and a pair of catch members aligned with the latch members wherein each catch member is provided on the front end of one of the track members.

10. The arrangement as in claim 9 wherein each of the latch members are provided with a push button release mechanism.

11. The arrangement as in claim 5 wherein said first means comprises:
   a pair of complementary magnetic members wherein one of the magnetic members is provided on the front edge of the framework member and the other magnetic member is provided on the front portion of the sunroof opening.

12. The arrangement as in claim 5 wherein said first means comprises:
   a pair of latch members disposed on opposite sides of the front edge of the framework member and a pair of catch members aligned with the latch members wherein each catch member is provided on the front end of one of the track members.

13. The arrangement as in claim 12 wherein each of the latch members are provided with a push button release mechanism.

14. The arrangement as in claim 1 wherein the framework member is provided with a handle element.

15. A screen arrangement for the sunroof opening in a vehicle wherein the arrangement comprises:

a mounting unit including a pair of elongated track members mounted on opposite sides of the sunroof opening wherein each track member has a rear wall, a bottom portion, and a front lip which define an elongated shallow channel; wherein, each of the track members has a generally W-shaped cross sectional configuration;

a screen unit including a screen member suspended within a generally rigid framework member having opposite sides provided with downwardly depending slide elements that are dimensioned to be received in the elongated shallow channel in each track member; and, first means for captively engaging the screen unit relative to the mounting unit.

* * * * *